United States Patent
Pillai et al.

(10) Patent No.: US 8,451,094 B2
(45) Date of Patent: May 28, 2013

(54) PHASE HOPPING TO REDUCE INTERFERENCE AND IMPROVE RADIO FREQUENCY IDENTIFICATION (RFID) TAG THROUGHPUT

(75) Inventors: Vijay Pillai, Fremont, CA (US); Pavel Nikitin, Seattle, WA (US); For Sander Lam, Bothell, WA (US)

(73) Assignee: Intermec IP Corp., Everett, WA (US)

( * ) Notice: Subject to any disclaimer, the term of this patent is extended or adjusted under 35 U.S.C. 154(b) by 748 days.

(21) Appl. No.: 12/366,469

(22) Filed: Feb. 5, 2009

(65) Prior Publication Data

US 2009/0219141 A1    Sep. 3, 2009

Related U.S. Application Data

(60) Provisional application No. 61/026,691, filed on Feb. 6, 2008.

(51) Int. Cl.
- *H04Q 5/22* (2006.01)
- *G08C 19/12* (2006.01)
- *H03D 1/04* (2006.01)
- *H04B 1/10* (2006.01)
- *H04B 7/00* (2006.01)

(52) U.S. Cl.
USPC ......... 340/10.2; 340/13.1; 375/346; 455/296; 455/304; 455/278.1

(58) Field of Classification Search
USPC .............. 340/13.1, 10.2; 455/296, 304, 278.1
See application file for complete search history.

(56) References Cited

U.S. PATENT DOCUMENTS

| | | | | |
|---|---|---|---|---|
| 4,859,972 A | * | 8/1989 | Franke et al. | 333/164 |
| 5,220,683 A | * | 6/1993 | Rudish | 455/146 |
| 5,596,329 A | | 1/1997 | Searle et al. | 342/374 |
| 5,777,561 A | * | 7/1998 | Chieu et al. | 340/10.32 |
| 5,974,301 A | | 10/1999 | Palmer et al. | 455/63 |
| 6,498,544 B1 | * | 12/2002 | Yung | 333/138 |
| 7,009,515 B2 | | 3/2006 | Carrender | 340/572.1 |
| 7,065,156 B1 | | 6/2006 | Kuchi | 375/299 |
| 2004/0196177 A1 | * | 10/2004 | Billington et al. | 342/174 |
| 2004/0208624 A1 | * | 10/2004 | Fathallah et al. | 398/161 |
| 2005/0179521 A1 | | 8/2005 | Pillai et al. | 340/10.34 |
| 2008/0110989 A1 | * | 5/2008 | Shanks | 235/439 |
| 2008/0165012 A1 | * | 7/2008 | Choi et al. | 340/572.7 |
| 2008/0266059 A1 | * | 10/2008 | Murofushi et al. | 340/10.3 |

FOREIGN PATENT DOCUMENTS

WO    WO 2008035263 A2 *    3/2008

OTHER PUBLICATIONS

Morgan, "Error Rate of Phase-Shift Keying in the Presence of Discrete Multipath Interference," Correspondence, *IEEE Transactions on Information Theory*, 18(4):525-528, 1972.

Vijay Pillai et al., "Phase Hopping to Reduce Interference and Improve Radio Frequency Identification (RFID) Tag Throughput," U.S. Appl. No. 61/026,691, filed Feb. 6, 2008, 33 pages.

* cited by examiner

*Primary Examiner* — Brian Zimmerman
*Assistant Examiner* — Omeed Alizada
(74) *Attorney, Agent, or Firm* — Seed IP Law Group PLLC (57) ABSTRACT

A radio frequency identification (RFID) reader outputs an interrogation signal, and hops/varies the phase of the interrogation signal sent by the RFID reader over time. Varying the phase of the interrogation signal enables the RFID reader to provide, for each zone of an RF field of the RFID reader, a particular phase that reduces the effects of interference RF signal(s) present in that zone of the RF field. Reducing the interference in each zone of the RF field increases the throughput of RFID tags that can be successfully read by the RFID reader.

19 Claims, 4 Drawing Sheets

PHASE HOPPING TO REDUCE INTERFERENCE AND IMPROVE RADIO FREQUENCY IDENTIFICATION (RFID) TAG THROUGHPUT

CROSS REFERENCE TO RELATED APPLICATIONS

This application claims benefit under 35 U.S.C. 119(e) of U.S. Provisional Patent Application Ser. No. 61/026,691, filed Feb. 6, 2008, entitled "Phase Hopping to Reduce Interference and Improve Radio Frequency Identification (RFID) Tag Throughput", which is incorporated herein by reference in its entirety.

TECHNICAL FIELD

This disclosure generally relates to the field of automatic data collection (ADC), for example, data acquisition via radio frequency identification (RFID) tags. More particularly but not exclusively, the present disclosure relates to improving the reading of RFID tags by an RFID reader in an environment where interference is present.

BACKGROUND INFORMATION

The ADC field includes a variety of different types of ADC data carriers and ADC readers operable to read data encoded in such data carriers. For example, data may be encoded in machine-readable symbols, such as barcode symbols, area or matrix code symbols, and/or stack code symbols. Machine-readable symbols readers may employ a scanner and/or imager to capture the data encoded in the optical pattern of such machine-readable symbols. Other types of data carriers and associated readers exist, for example magnetic stripes, optical memory tags, and touch memories.

Other types of ADC carriers include RFID tags that may store data in a wirelessly accessible memory, and may include a discrete power source (i.e., an active RFID tag), or may rely on power derived from an interrogation signal (i.e., a passive RFID tag). RFID readers typically emit a radio frequency (RF) interrogation signal that causes the RFID tag to respond with a return RF signal encoding the data stored in the memory.

Identification of an RFID device or tag generally depends on RF energy produced by a reader or interrogator arriving at the RFID tag and returning to the reader. Multiple protocols exist for use with RFID tags. These protocols may specify, among other things, particular frequency ranges, frequency channels, modulation schemes, security schemes, and data formats.

Many ADC systems that use RFID tags employ an RFID reader in communication with one or more host computing systems that act as central depositories to store and/or process and/or share data collected by the RFID reader. In many applications, wireless communications is provided between the RFID reader and the host computing system. Wireless communications allow the RFID reader to be mobile, may lower the cost associated with installation of an ADC system, and permit flexibility in reorganizing a facility, for example a warehouse.

RFID tags typically include a semiconductor device (such as a chip) having the memory, circuitry, and one or more conductive traces that form an antenna. Typically, RFID tags act as transponders, providing information stored in the memory in response to the RF interrogation signal received at the antenna from the reader or other interrogator. Some RFID tags include security measures, such as passwords and/or encryption. Many RFID tags also permit information to be written or stored in the memory via an RF signal.

When an RFID tag is operating in an interrogation (RF) field of more than one RFID reader, the RFID tag is exposed to interrogation signals that are respectively sent from the multiple RFID readers. These interrogation signals interfere with each other (e.g., "reader-on-tag" interference). For example, an RFID tag might be present both in the interrogation field of a first RFID reader sending out a first interrogation signal to read the RFID tag and in the interrogation field of a second RFID reader sending out a second interrogation signal to read some other RFID tag(s). Depending on the strength of the second interrogation signal, the second interrogation signal might interfere with the first interrogation signal, such that the RFID tag is unable to decode or otherwise properly process the first interrogation signal. This inability of the RFID tag to properly process the first interrogation signal can prevent the RFID tag from issuing an appropriate return signal in response to the first interrogation signal. As a result, the first RFID reader may be unable to read or is barely able to read the RFID tag.

This severe degradation in system performance occurs, as explained above, when one or more other interrogation signals from other RFID readers (in the vicinity of the first RFID reader) interferes with the first interrogation signal from the first RFID reader. Degradation in system performance due to interference may also occur when there are non-RFID devices (in the vicinity of the first RFID reader) that operate in the same frequency band as the first interrogation signal and that generate RF signals that propagate into the interrogation field of the first RFID reader.

BRIEF SUMMARY

A radio frequency identification (RFID) reader apparatus may be summarized as including: antenna means for sending an interrogation signal to at least one RFID tag present in an RF field of said antenna means; phase shifting means for providing a phase shift to said interrogation signal sent by said antenna means; and control means for controlling said phase shifting means to change said phase shift to a different value over time to minimize interference from at least one interference signal present in said RF field.

An RFID reader apparatus may be summarized as including: at least one antenna to send an interrogation signal to at least one RFID tag present in an RF field of said antenna; a phase shift device coupled to said at least one antenna to provide a phase shift to said interrogation signal sent by said at least one antenna; and a controller coupled to said phase shift device to control said phase shift device to change said phase shift to a different value over time to minimize interference from at least one interference signal present in said RF field.

Still another aspect provides method to minimize interference from at least one interference signal present in an RF field of an RFID reader may be summarized as including: sending an interrogation signal from said RFID reader to at least one RFID tag present in said RF field, said interrogation signal having a phase; changing said phase of said interrogation signal over time until a particular phase of said interrogation signal is obtained that places said interrogation signal in an out-of-phase relationship relative to said at least one interference signal, said particular phase corresponding to minimal interference between said interrogation signal and said at least one signal relative to interference at other phases of said interrogation signal; and reading said at least one RFID tag using said interrogation signal having said particular phase.

An article of manufacture may be summarized as including a computer-readable medium having instructions stored thereon that are executable by a processor to minimize interference from at least one interference signal present in a radio frequency (RF) field of a radio frequency identification (RFID) reader, by: determining if at least one return signal is received, from at least one RFID tag present in said RFID field, in response to an interrogation signal sent by said RFID reader to said at least one RFID tag; and if said at least one return signal is determined to not be received or is not able to be decoded successfully by said RFID reader, changing a phase of said interrogation signal over time until a particular phase of said interrogation signal is obtained that places said interrogation signal in an out-of-phase relationship relative to said at least one interference signal, said particular phase corresponding to minimal interference between said interrogation signal and said at least one interference signal relative to interference at other phases of said interrogation signal.

BRIEF DESCRIPTION OF THE SEVERAL VIEWS OF THE DRAWINGS

Non-limiting and non-exhaustive embodiments are described with reference to the following drawings, wherein like reference numerals refer to like parts throughout the various views unless otherwise specified. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations associated with RFID tags and RFID readers, computer and/or telecommunications networks, and/or computing systems are not shown or described in detail to avoid obscuring aspects of the embodiments. While the description and claims may employ the term radio frequency, RF or other variations of such, such is not intended to be limiting, but rather to include wireless communications in those portions of the electromagnetic spectrum typically associated with RFID by those of ordinary skill in the art of RFID, for example, the portions typically denominated as radio and microwave wavelength or frequency portions of the electromagnetic spectrum.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Reference throughout this specification and claims to "radio frequency" or RF includes wireless transmission of electromagnetic energy, including, but not limited to, energy with frequencies or wavelengths typically classed as falling in the radio and microwave portions of the electromagnetic spectrum.

The headings provided herein are for convenience only and do not interpret the scope or meaning of the embodiments.

As an overview, an embodiment provides a technique to reduce the interference due to one or more interference (RF) signals that are present in an RF field of an interrogation signal sent by an RFID reader. The RF signals (at or near a same operating frequency of the interrogation signal) may interfere with the interrogation signal received at one or more RFID tags present in the RF field of the RFID reader. Due to the interference, the RFID tag(s) may not be able to properly respond to the interrogation signal, thereby preventing the RFID reader from successfully reading the RFID tag(s).

Accordingly, at least one embodiment varies a phase of the interrogation signal sent by the RFID reader. That is, the phase of the interrogation signal is hopped or otherwise changed from one phase to another phase. For each of a plurality of zones in the RF field, a particular phase will provide the interrogation signal with an optimal phase offset relative to the interference signal(s) present at that zone, thereby minimizing interference at the RFID tag(s) being interrogated at that zone. By minimizing interference, the throughput of successfully read RFID tags in the RF field can be increased.

In a typical propagation environment, an interrogation signal from an RFID reader comes to an RFID tag using more than one path (e.g., there are reflection, diffraction, refraction, and scattering of waves). This behavior causes a frequency-selective multipath fading that can cause an RFID tag to not be read by the RFID reader. The challenges presented by multipath interference in wireless communications and the role played by the phase of the signal are described further in: D. Morgan, "Error Rate of Phase-Shift Keying in the Presence of Discrete Multipath Interference," Correspondence, IEEE Transactions on Information Theory, Volume 18, Issue 4, July 1972, pages 525-528.

At least one embodiment provides a phase-hopping technique to equalize frequency selective multipath channels between an RFID reader and the RFID tags around it.

Figure 1:
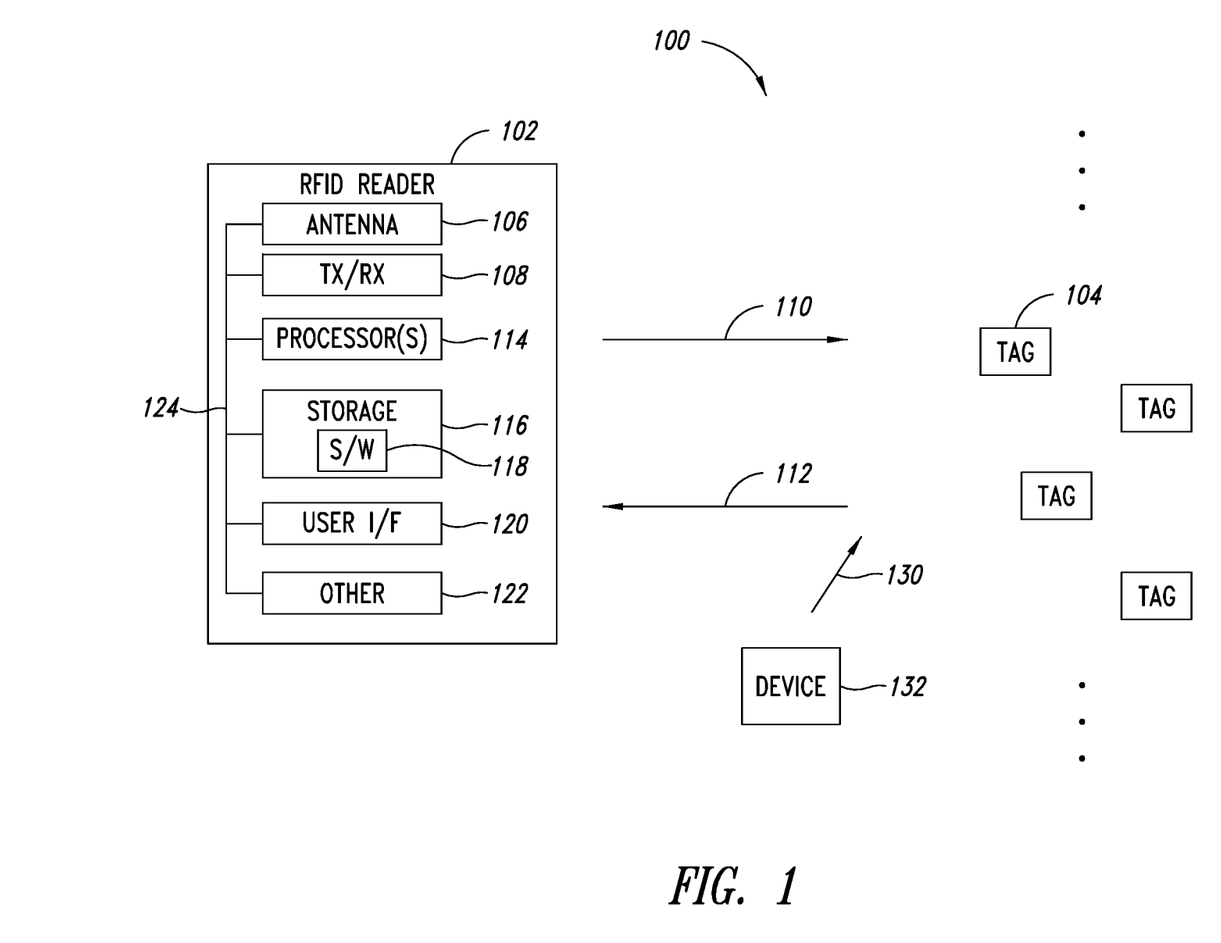
FIG. 1 shows a block diagram of one embodiment of an RFID reader reading at least one RFID tag in an environment that has at least one device that generates at least one interference signal.

FIG. 1 shows an embodiment an automatic data collection device system 100 in the form of an RFID reader 102 having capability to read one or more RFID tags 104. For simplicity of explanation hereinafter, the RFID reader 102 will be described in the context of being a portable handheld automatic data collection device that is dedicated to reading the RFID tags 104. In other embodiments, the automatic data collection device can be a stationary (non-portable) or semi-stationary device (such as attached to a forklift), and/or can be a multi-mode device having the capability to read other types of data carriers (e.g., bar code symbols, image code symbols) in addition to reading RFID tags.

The RFID reader 102 includes at least one antenna 106 and related transmitter/receiver ("transceiver") circuitry 108. The antenna 106 and transmitter/receiver circuitry 108 are adapted to send one or more RF interrogation signals 110 to the RFID tag 104, and are adapted to receive one or more RF return signals 112 sent by the RFID tag 104.

The RFID reader 102 may include a single antenna 106 to both transmit the interrogation signal 110 and to receive the return signal 112. Alternatively, the RFID reader 102 may include separate antennas 106 respectively for transmission and reception. For the sake of simplicity of explanation hereinafter, embodiments will be described with respect to the RFID reader 102 having the single antenna 106 for both transmission and reception. Such various embodiments can be modified as appropriate to provide two or more separate antennas 106 respectively for transmission and reception.

The RFID reader 102 includes one or more processors 114. Examples of the processor 114 can include, but not be limited to, a field programmable gate array (FPGA), application specific integrated circuit (ASIC), microprocessor, digital signal processor (DSP), or other suitable controller. The processor 114 is adapted to process the return signals 112 received by the RFID reader 102, as well as to control the operation of various other components of the RFID reader 102. In at least one embodiment that will be explained later below, the processor 114 is adapted to determine whether a return signal 112 has been received and/or successfully decoded, provide a first adjustment signal to control a phase shift provided by a phase shifter in the transceiver circuitry 108 if the return signal 112 is not received or successfully decoded, so as to provide the RFID reader 102 with "phase-hopping" capability.

In at least one embodiment, the RFID reader 102 includes a computer-readable storage medium 116 encoded with or otherwise storing instructions. The storage medium 116 can include, for example, one or more memories such as random access memory (RAM), read only memory (ROM), field programmable gate array, flash memory, or other type of memory. The instructions stored in the storage medium 116 can include a computer program in the form of software or firmware, for example. For the sake of illustration, the instructions stored in the storage medium 116 are depicted in FIG. 1 as software 118. In at least one embodiment, the software 118 is executable by the processor 114 to perform the various operations described herein pertaining to reading the RFID tag 104, adjusting phase, and other operations related to controlling various components of the RFID reader 102.

The RFID reader 102 may include a user interface 120. The user interface 120 is adapted to receive user commands pertaining to controlling the operation of the RFID reader 102, such as a command to send the interrogation signal 110. The user interface 120 is also adapted to present results of the read operation to the user (such as via a display screen), or to otherwise present audio (e.g., via a speaker), visual (e.g., via one or more LED, OLED, LCD) and/or tactile (e.g., via a vibrator) indicators to the user related to the operation of the RFID reader 102.

The RFID reader 102 may include other components 122 to support operation of the RFID reader 102. Such components 122 can include, for example, a power source (such as a battery), communication components to enable the RFID reader to communicate with an external network/system (such as to download/upload data and software updates), a decrypter to decrypt encrypted information decoded from the received return signals 112, additional memory and/or processors, scanning and/or imaging components if the RFID reader 102 is a multi-mode data collection device, AC power plug, and so forth. A decoder to decode information encoded in the received return signals 112 can be present in the components 122 and/or in the transceiver circuitry 108.

One or more buses 124 (e.g., instruction, data, power buses) couple the various components of the RFID reader 102 together.

In the environment depicted in FIG. 1, one or more other interference (RF) signals 130 may be present. For example, the interference signal(s) 130 might be interrogation signal(s) originating from one or more other RFID readers. Alternatively or additionally, the interference signal(s) 130 might originate from some other device that is not necessarily an RFID reader but nevertheless still outputs RF signals that may interfere with the interrogation signal 110. In FIG. 1, the other RFID reader(s) and/or other (non-RFID) device(s) are symbolically represented by at least one device 132.

In the environment of FIG. 1, the interference signal(s) 130 may interfere with the interrogation signal 110 at the RFID tag(s) 104. Accordingly, the RFID tag(s) 104 being interrogated by the RFID reader 102 might not be properly read by the RFID reader 102 and therefore might not send the return signal 112 (or might send an improper/non-decodable return signal 112), if the RFID reader 102 does not perform certain operations (described in detail below) to address the interference.

The interference may be due to several factors. For example, the device 132 might be providing the interference signal 130 at a same frequency as the interrogation signal 110 and at a sufficient level/amplitude to interfere with the interrogation signal 110. In the context of RFID readers, for example, the device 132 might be another RFID reader operating in the vicinity of the RFID reader 102 and attempting to interrogate other RFID tags than those being interrogated by the RFID reader 102. In the context of non-RFID readers, for example, the device 132 might be located in close proximity to the RFID reader 102 such that the signal 130 interferes with the interrogation signal 110 and/or the device 132 might be located remotely (e.g., no where in proximity to) the RFID reader 102 but is nevertheless providing the signal 130 at a sufficient strength to interfere with the interrogation signal 110. Hence, the interference signal(s) 130 can be considered as one or more stray signals.

An example implementation of the system 100 of FIG. 1 is a non-frequency hopping RFID system, such as those prevalent in Europe, wherein the other (proximate) RFID reader (represented by the device 132) is often operating at the same frequency as the RFID reader 102. The amount of interference at the RFID tag 104 may be based at least in part on the frequency offset between the interrogation signal 110 and the signal 130—the further these signals are apart in frequency, the more immune the RFID tag 104 is to interference. Hence, in such non-frequency hopping systems where two devices may be operating at or near the same frequency, the frequency separation may be insufficient to minimize interference.

Another example implementation of the system 100 of FIG. 1 is a frequency hopping system, wherein the frequency of the interrogation signal 110 from the RFID reader 102 is changed within a single frequency band from one frequency to another over time. In such a frequency hopping system, the interference signal(s) 130 from the device(s) 132 may be present and may interfere with the interrogation signal 110 at one or more of the hopping frequencies within the frequency band. Embodiments of a frequency hopping method are disclosed in U.S. Patent Application Publication No. 20050179521, entitled "FREQUENCY HOPPING METHOD FOR RFID TAG," assigned to the same assignee as the present application, and incorporated herein by reference in its entirety.

The interrogation signal 110 from the RFID reader 102 may be represented as $RF_1 \cos(\omega t)$, wherein $RF_1$ is the amplitude and $\omega$ is the operating frequency of the interrogation signal 110. The interference signal 130 (at or near the same frequency $\omega$) may be represented as $RF_2 \cos(\omega t + A)$, wherein $RF_2$ is the amplitude of the interference signal 130 and A is a phase offset of the interference signal 130 from the interrogation signal 110 at the RFID tag 104.

The combined signal from the RFID reader 102 and the device 132 can thus be represented as follows:

$$RF_1 \cos(\omega t) + RF_2 \cos(\omega t + A) \qquad (1).$$

Equation (1) is a maximum when A is equal to 0 (e.g., the interrogation signal 110 and the interference signal 130 are approximately in phase with each other). Thus, when Equation (1) is a maximum, interference is at a maximum, and the signal coming into the RFID tag 104 can appear garbled (depending on the strength/level of the amplitudes $RF_1$ and $RF_2$). Hence, the nature of the incoming (combined) signal may completely disable the RFID tag 104 from being read.

It is then noted that Equation (1) is a minimum (and hence interference is a minimum) when A is equal to 90 degrees. That is, at least one embodiment minimizes interference at the RFID tag 104 by making the interrogation signal 110 offset in phase from the interference signal 130 by approximately 90 degrees (e.g., the interrogation signal 110 and the interference signal 130 are out-of-phase with each other by approximately 90 degrees).

In situations where it is not possible to determine in advance the phase difference between the interrogation signal 110 and the interference signal 130 at a particular location in the RF field of the RFID reader 102, at least one embodiment hops or otherwise sweeps the interrogation signal 110 through different phases at each zone in the RF field of the RFID reader 102. This phase hopping thus moves a zone of minimum interference (where there is the approximately 90 degree phase difference) throughout the RF field of the RFID reader 104, and the RF tags 104 are read at each zone. This phase hopping will be further illustratively described below with respect to FIG. 5.

Figure 2:
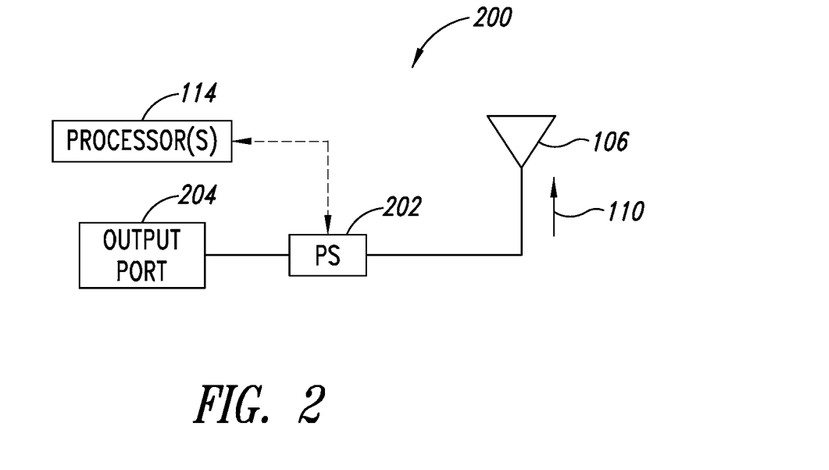
FIG. 2 is a schematic diagram showing a portion of transceiver circuitry of the RFID reader of FIG. 1 according to one embodiment.

FIG. 2 shows an embodiment of a first portion 200 of the transceiver circuitry 108, specifically components of the transceiver circuitry 108 downstream from the antenna 106. For the sake of brevity and simplicity of explanation, only the components of the transceiver circuitry 108 (as depicted in the first portion 200) that are relevant to understanding the features and operation of one embodiment are described in detail herein. Other components of the transceiver circuitry 108 that are less relevant are not shown or described in detail herein.

The first portion 200 of at least one embodiment includes a phase shifter 202 adapted to introduce a phase shift into the interrogation signal 110. The phase shifter 202 of one embodiment provides the phase shift with a value X of 0 degrees $\leq X \leq 90$ degrees, such phase shifts of 0, 10, 20, 30, 40, ..., 90 degrees, for example, such that the interrogation signal 110 of Equation (1) above can be represented as $RF_1 \cos(\omega t + 0)$, $RF_1 \cos(\omega t + 10)$, $RF_1 \cos(\omega t + 20)$, etc. These phase shift values (in increments of 10 degrees) are merely illustrative of example phase shifts that can be provided. Other possible values of phase shifts can be incremented with different constant and/or non-constant values, such that the separation between different phases need not necessarily be 10 degrees. Moreover, fractional values for the phase shift (e.g., 10.316 degrees) can be provided alternatively or additionally to whole values (e.g., 10 degrees).

The amount of time that the interrogation signal 110 remains at a particular phase, before hopping to another phase, can be any suitable amount of time. For example, some embodiments of the RFID reader 102 can determine whether one or more tags are responding in as little as 10 ms. Thus, at least one embodiment of the RFID reader 102 can change phase in as little as 10 to 20 ms, as soon as no more RFID tags 104 are responding. Again, these specific time values are merely illustrative, and can vary from one embodiment to another based on factors such as (but not limited) to response time of the particular type of RFID tags 104, user configuration of timing between phase hops, and so forth.

In FIG. 2, a first terminal (output) of the phase shifter 202 is coupled to the antenna 106, and a second terminal (input) of the phase shifter 202 is coupled to an output port 204 of the RFID reader 102. Accordingly, the interrogation signal 110 received by the second terminal of the phase shifter 202 has the phase shift absent therefrom, and the interrogation signal 110 sent to the antenna 106 for transmission to the RFID tag 104 has the phase shift added thereto by the phase shifter 202.

In at least one embodiment, the processor 114 is adapted to provide control signal to the phase shifter 202 to control the timing and/or amount (separation) of phase hops from one phase to another. For example, the processor 114 can control the phase shifter 202 such that a phase hop is initiated every 20 ms, with an increment of 10 degrees between each phase. In at least another embodiment, the timing and/or amount of phase hopping can be more dynamic and variable in nature, such as by having the processor 114 analyze the return signal(s) 112 to determine whether the quality (e.g., whether readable or too garbled) and/or quantity (e.g., too few readable return signals received) of the return signal(s) 112 requires a change to another phase, determining the timing of such phase change, and determining the amount of such phase change. This control by the processor 114 is symbolically represented in FIG. 2 by a broken line between the processor 114 and the phase shifter 202.

Figure 3:
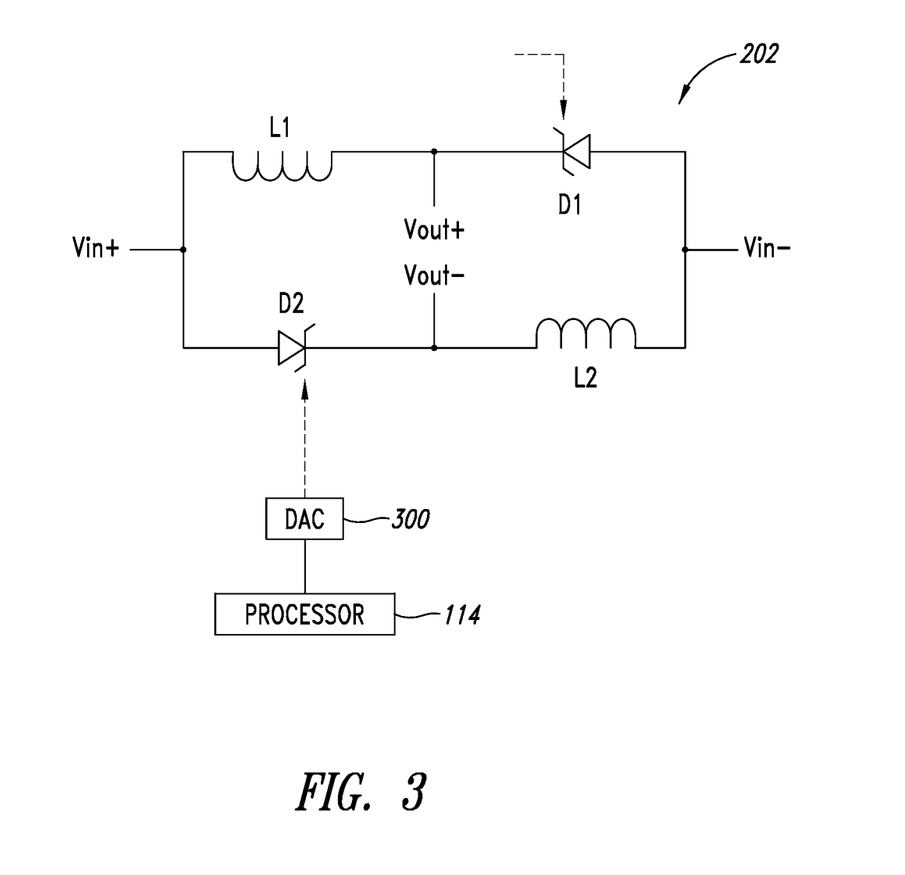
FIG. 3 is a schematic diagram of one embodiment of a phase shifter for the transceiver circuitry of FIG. 2.

At least one embodiment of the phase shifter 202 can be implemented by the circuit shown in FIG. 3. Specifically in the depicted embodiment of FIG. 3, the phase shifter 202 includes a parallel combination of two varactors each respectively coupled in series with an inductor. The varactors are each represented by a diode D1 and a diode D2, and the inductors are each represented as an inductor L1 and an inductor L2 coupled respectively in series with the diodes D1 and D2.

In FIG. 3, the magnitude of the voltage Vout (output voltage into the antenna 106) is the same as the magnitude of the voltage Vin (input voltage from the output port 204) appearing respectively at output and input terminals of the phase shifter 202, but these voltages are separated by a phase difference $\tan^{-1}(X_L/X_C)$. The phase difference $\tan^{-1}(X_L/X_C)$ at the output terminal corresponds to the phase shift introduced by the phase shifter 202 into the interrogation signal 110, wherein $X_L$ is the inductive reactance and $X_C$ is the capacitive reactance.

The varactors of at least one embodiment are controlled by the first adjustment signal provided by the processor 114 in cooperation with the software 118, to thereby adjust the phase shift, which is present at the output terminal of the phase shifter 202. The first adjustment signal from the processor 114 is converted in at least one embodiment from a digital signal to an analog signal by a digital-to-analog converter (DAC) 300 coupled to the processor 114. Control of the varactors by the first adjustment signal from the DAC 300 is represented in FIG. 3 by broken lines. The DAC 300 may form part of the transceiver circuitry 108 and/or may be one of the other components 122.

In other embodiments, the phase shifter 202 can be provided with other elements and/or configuration than what is depicted in FIG. 3.

Figure 4:
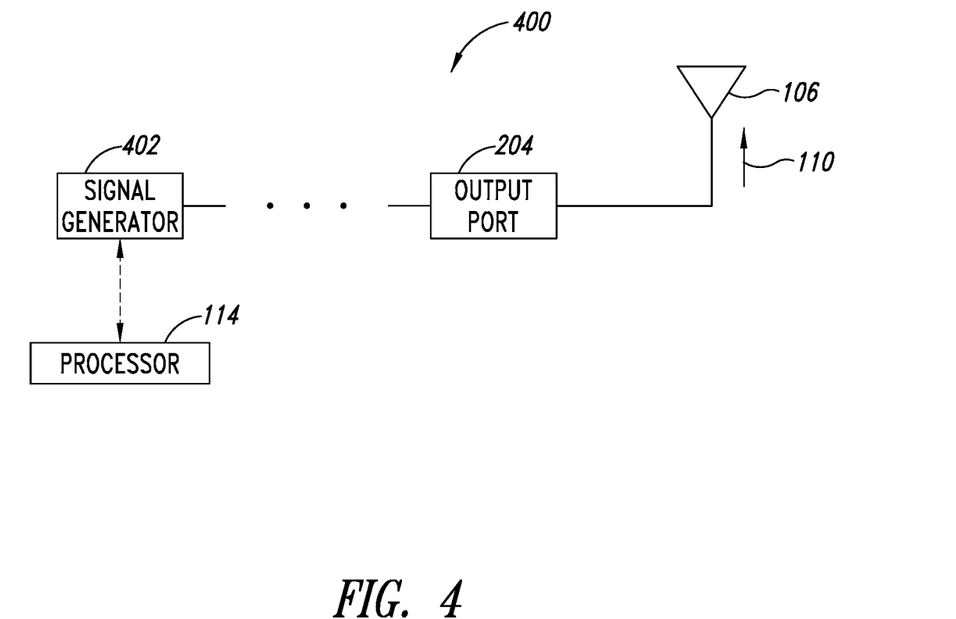
FIG. 4 is schematic diagram showing a portion of transceiver circuitry of the RFID reader of FIG. 1 according to another embodiment.

FIG. 4 is schematic diagram showing a portion 400 of the transceiver circuitry 108 of the RFID reader 102 according to another embodiment. Specifically with the embodiment of FIG. 4, the phase shift is provided by a signal generator 402 alternatively or additionally to the dedicated phase shifter 202 of FIGS. 2-3. For instance, the signal generator 402 generates the interrogation signal 110 with a particular frequency and phase. The signal generator 402 of one embodiment is a variable/adjustable device, coupled to and responsive to a second adjustment signal from the processor 114, to change the phase (and/or frequency) of the generated interrogation signal 110. Control by the processor 114 of the phase (and/or frequency) of the interrogation signal 110 provided by the signal generator 402 is represented in FIG. 4 by a broken line between the processor 114 and the signal generator 402.

Figure 5:
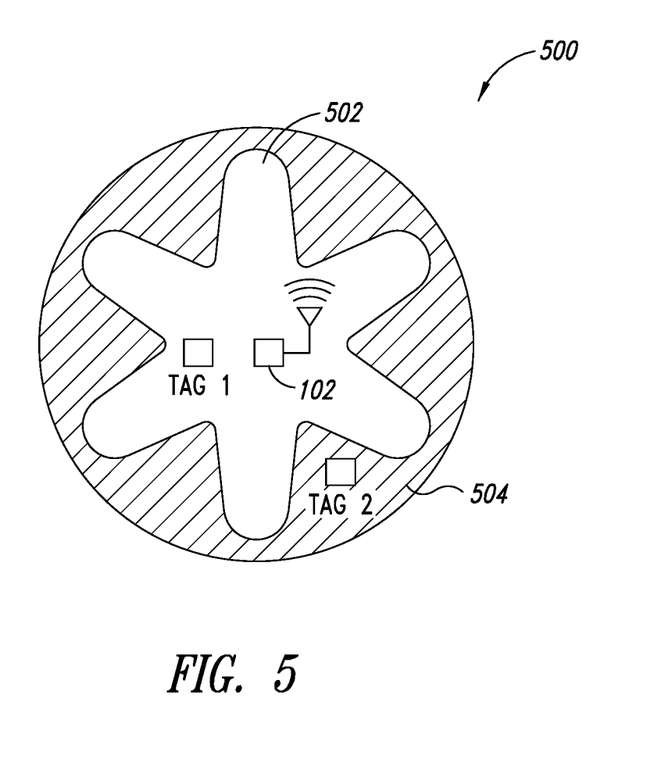
FIG. 5 is a pictorial representation of the RFID reader of FIG. 1 reading RFID tags using phase hopping according to one embodiment.

FIG. 5 is a pictorial representation of the RFID reader 102 reading a plurality of RFID tags using phase hopping in an environment that includes the interference signal(s) 130 from one or more other devices 132 according to one illustrated embodiment. In FIG. 5, an RF field 500 (symbolically represented as being generally circular in shape) of the RFID reader 102 is shown. The field 500 represents an area within the range of the interrogation signal 110 and having present therein one or more RFID tags 104 (represented by tag 1 and tag 2 in FIG. 5) that the RFID reader 102 desires to interrogate.

A zone 502 represents a region (un-shaded) or other portion of the field 500 where there is insufficient interference with the interrogation signal 110 to adversely affect the operation of tag 1 present therein. For example and as previously explained above, this insufficient interference might occur where the interrogation signal 110 is represented by $RF_1 \cos(\omega t)$ and the interference signal 130 is represented by $RF_2 \cos(\omega t+90)$ to thereby provide minimal interference; where the amplitude of $RF_1$ is otherwise sufficiently greater than the amplitude $RF_2$ such that any interference from the interference signal 130 does not adversely affect the operation of tag 1 in the zone 502; where the interrogation signal 110 and the interference signal 130 are at different diverse frequencies; and so forth. Accordingly, the RFID reader 102 does not need to perform any phase hopping in order to successfully read tag 1 present in the zone 502.

A zone 504 represents a region (shaded) or other portion of the field 500 where there is sufficient interference with the interrogation signal 110 to adversely affect the operation of tag 2 present therein. That is, the level of interference in zone 504 is sufficiently large so as to prevent the RFID reader 102 from successfully reading tag 2. For example and as previously explained above, this large amount of interference might occur where the interrogation signal 110 is represented by $RF_1 \cos(\omega t)$ and the interference signal 130 is represented by $RF_2 \cos(\omega t+0)$ to thereby provide maximum interference; where the amplitude of $RF_2$ is otherwise sufficiently large relative to the amplitude $RF_1$ such that any interference from the signal 130 adversely affects the operation of tag 2 in the zone 504; where the interrogation signal 110 and the interference signal 130 are the same or nearly the same frequency; and so forth.

Accordingly in one embodiment, the RFID reader 102 sweeps or otherwise hops through different phases for the interrogation signal 110 in the zone 504. At one of these phase hops, the interrogation signal 110 in the zone 504 will become sufficiently out-of-phase with respect to the interference signal 130 in the zone 504, such as where a phase difference between the interrogation signal 110 and the interference signal 130 is approximately 90 degrees, thereby resulting in minimum interference at the zone 504. At this particular phase, the interference is reduced to a level that enables tag 2 to properly receive and process the interrogation signal 110, thereby enabling the RFID reader 102 to successfully read tag 2 and/or any other RFID tag 104 in the zone 504 that were not able to be adequately read at other phases. As the RFID reader 102 continues to cycle through other phase(s) in the zone 504 and/or in other zones of the field 500, other tags (previously unreadable) in such zone(s) may then become readable due to the interference being reduced at such other phase(s).

The field 500 may represent, for example, an RF field of the antenna 106 when the RFID reader 102 is held stationary to read a group of RFID tags 104 affixed to objects held in a first pallet. The RFID reader 102 may be re-positioned to direct the interrogation signal 110 at the first pallet from a different direction. Further, the RFID reader 102 may be re-positioned, for example to read RFID tags 104 affixed to objects held in a second (different) pallet across the room from the first pallet. In each of these various example positions of the RFID reader 102, the field 500 thus changes locations (and may also change in shape/area). The phase difference between the interrogation signal 110 and the interference signal 130 may vary between and/or within each of these locations of the RFID field 500. Therefore, by hopping the interrogation signal 110 through different phases as described herein wherever the field 500 is located, one or more specific phases of the interrogation signal 110 can be obtained at each location of the field 500 to provide a sufficient out-of-phase relationship with respect to the interference signal 130 to minimize interference therewith.

Figure 6:
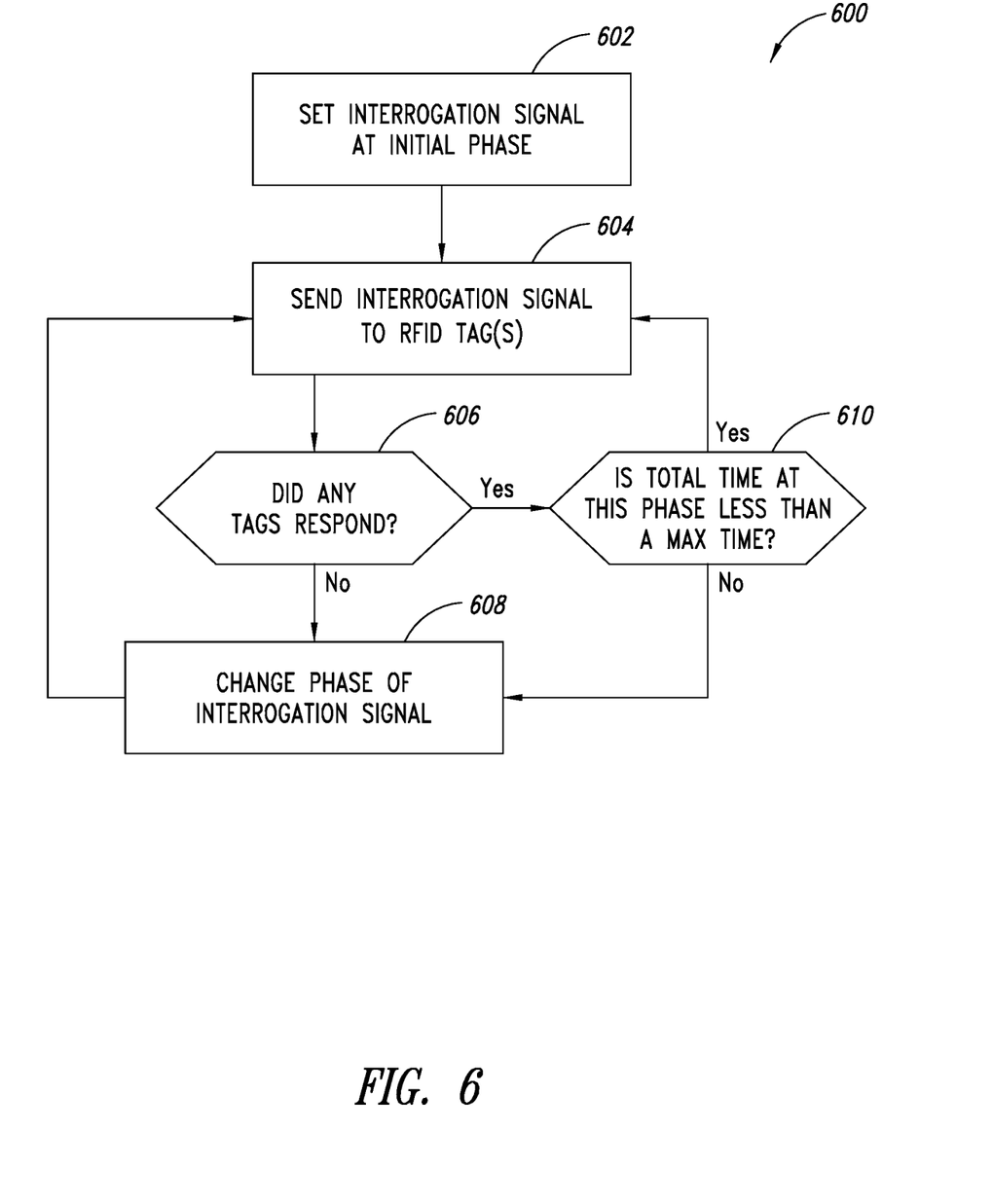
FIG. 6 a flowchart depicting one embodiment of a method to read RFID tags using phase hopping in an environment having interference.

FIG. 6 is a flowchart of an embodiment of a method 600 that can be performed by the RFID reader 102 to improve the reading of one or more RFID tag(s) 104 in an environment having interference, using phase hopping as explained above to reduce interference at the RFID tag(s) 104 being read. In one embodiment, one or more operations in the method 600 can be performed by software or other computer-readable instructions encoded in or otherwise stored in a computer-readable medium and executed by a processor. For instance, such operations may be embodied in instructions stored in the storage medium 116 and executed by the processor 114. In another embodiment, one or more operations in the method 600 can be performed by hardware singly or in combination with software or other computer-readable instructions executed by the processor 114.

The various operations depicted in FIG. 6 need not necessarily occur in the exact order shown. Moreover, various operations may be added, removed, combined, and/or modified.

At a block 602, the RFID reader 102 generates the interrogation signal 110 having an initial phase. For instance where the interrogation signal 110 is represented by a cosine waveform, the initial phase may be 0 degrees, such as represented by $RF_1 \cos(\omega t)$ in Equation (1) above. At a block 604, the interrogation signal 110 having the initial phase is sent to one or more RFID tags 104 present in the field 500 of the RFID reader 102.

The processor 114 determines at a block 606 whether any RFID tags 104 (such as tag 1 of FIG. 5) responded to the interrogation signal 110, such as for example responding within a time limit of 20 ms. If at the block 606 no RFID tags 104 are determined to have responded and/or if the return signal(s) 112 are garbled (e.g., not able to be successfully decoded or otherwise unreadable), then the phase of the interrogation signal 110 is changed at a block 608. As previously explained above, the phase change can be provided by the phase shifter 202 in response to a first adjustment signal from the processor 114 and/or the phase change can be provided by the variable-phase signal generator 402 in response to a second adjustment signal from the processor 114. The interrogation signal 110 having this phase change is then sent again at the block 604 to read the RFID tag(s) in the field 500.

Returning to block 606, if an RFID tag 104 (such as tag 1 in the zone 502) did respond to the interrogation signal 110 (having the initial phase) with the return signal 112 and the return signal 112 is successfully decoded by the RFID reader 102, then the processor 114 determines at a block 610 whether the time spent at the initial phase is less than a maximum time. If less than the maximum time, then the RFID reader 102 continues to send the interrogation signal 110 at the initial phase at the block 604 to any other RFID tag(s) 104 in the field 500 that might be possible to read at the initial phase.

If the time spent at the current phase is determined to be greater than the maximum time at the block 610, then the processor 114 initiates a change (hop) to another phase at the block 608, and the process repeats as explained above.

The maximum time, at the block 610, to spend at any one phase can be configured to any suitable time duration. For instance, the maximum time can be slightly greater than an amount of time required for a single RFID tag to respond at the block 606. Thus, if the RFID tag 104 can respond in 10 ms, the maximum time can be set between 10 to 20 ms. As yet another example, the maximum time can be set to a duration to enable a plurality of RFID tags 104 to respond, in a situation where they do not necessarily respond simultaneously. Hence in such an embodiment, the maximum time can be set to 20-50 ms or other time duration configured by a user to enable a sufficient number of RFID tags 104 to respond before switching to another phase.

These specific time durations for response, sending the interrogation signal at a particular phase before changing to another phase, maximum time, etc. are all merely illustrative. Other embodiments can provide other time durations that are shorter, longer, and/or dynamic relative to the specific time durations illustrated above. Further in one embodiment, the comparison to a maximum time at the block 610 need not be performed at all.

In at least one embodiment that uses frequency hopping wherein the frequency $\omega$ of the interrogation signal 110 is changed within a single frequency band from one frequency to another over time, the phase shift can be swept/hopped or otherwise varied for each frequency hop so as to minimize the interference at each frequency hop. Minimizing the interference at each frequency hop maximizes the number of RFID tags 104 that are successfully read at each frequency hop, thereby increasing tag throughput.

For non-hopping implementations that use a fixed frequency $\omega$ for the interrogation signal 110, the method 600 sweeps/hops or otherwise varies the phase of the interrogation signal 110 at that fixed frequency. Accordingly, interference is reduced at each zone in the field 500 for a particular phase of the interrogation signal 110, thereby also increasing tag throughput in each zone of the field 500.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

As an example of a modification, the mathematics represented in Equation (1) and above and in the results thereof, can be modified appropriately in an embodiment wherein there is more than one interference signal 130 present. In such a situation, the phase shift provided to the interrogation signal 130 can be selected so as to provide minimal interference with respect to each individual or to the collective interference signals 130. Moreover, the interrogation signal 110 and the interference signal 130 have been represented in Equation (1) in terms of a cosine function. Equation (1) and the selection of a phase to provide an optimal phase offset of the interrogation signal 110 relative to the interference signal(s) 130 can be represented in terms of a sine or other trigonometric function.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A radio frequency identification (RFID) reader apparatus operable to read RFID tags, comprising:
   antenna means for sending an interrogation signal to at least one RFID tag present in an RF field of said antenna means;
   phase shifting means for providing a phase shift to said interrogation signal, sent by said antenna means; and
   control means for controlling said phase shifting means to change said phase shift to a different value over time said phase shifts occurring at a rate that is less than the data transfer rate of said RFID tags, wherein said phase shifts occur over time until a particular phase of said interrogation signal is obtained that places said interrogation signal in an out-of-phase relationship relative to said at least one interference signal.

2. The apparatus of claim 1 wherein said phase shifting means changes said value of said phase shift over time in each of a plurality of zones in said RF field, including:
   said phase shifting means providing said interrogation signal with a first phase that places said interrogation signal out-of-phase relative to said at least one interference signal in a first of said zones to minimize interference from said at least one interference signal in said first zone, and
   said phase shifting means providing said interrogation signal with a second phase, different from said first phase, that places said interrogation signal out-of-phase relative to said at least one interference signal in at least a second of said zones, different from said first zone, to minimize interference from said at least one interference signal in said at least second zone.

3. The apparatus of claim 1 wherein said at least one interference signal includes another interrogation signal sent by another RFID reader apparatus and having an operating frequency at or near an operating frequency of said interrogation signal.

4. The apparatus claim 3 wherein said at least one interference signal includes an RF signal sent by a non-RFID device and having an operating frequency at or near an operating frequency of said interrogation signal.

5. The apparatus of claim 4 wherein said antenna means sends said interrogation signal with a fixed operating frequency.

6. The apparatus of claim 4 wherein said antenna means sends said interrogation signal with an operating frequency that changes over time within a same frequency band.

7. The apparatus of claim 6 wherein said phase shifting means includes:
    a first branch having a first inductor and a first varactor coupled in series;
    a second branch having a second inductor and a second varactor coupled in series;
    an input terminal to receive said interrogation signal, absent said phase shift; and
    an output terminal coupled to said antenna means, said first and second branches being coupled in parallel between said input and output terminals, said first and second varactors being responsive to an adjustment signal provided by said processor to change a phase, at said output terminal, that is provided to said interrogation signal received at said input terminal.

8. The apparatus of claim 1 wherein said phase shifting means includes a variable signal generator to generate said interrogation signal and responsive to an adjustment signal provided by said control means to change said value of said phase shift in said generated interrogation signal.

9. A radio frequency identification (RFID) reader apparatus operable to read RFID tags, comprising:
    at least one antenna to send an interrogation signal to at least one RFID tag present in an RF field of said antenna;
    a phase shift device coupled to said at least one antenna to provide a phase shift to said interrogation signal sent by said at least one antenna; and
    a controller coupled to said phase shift device to control said phase shift device to change said phase shift to a different value over time said phase shifts occurring at a rate that is less than the data transfer rate of said RFID tags, wherein said phase shifts occur over time until a particular phase of said interrogation signal is obtained that places said interrogation signal in an out-of-phase relationship relative to said at least one interference signal.

10. The apparatus of claim 9 wherein said phase shift device is adapted to change said value of said phase shift over time in each of a plurality of zones in said RF field, wherein:
    said phase shift device is adapted to provide said interrogation signal with a first phase that places said interrogation signal out-of-phase relative to said at least one interference signal in a first of said zones to minimize interference from said at least one interference signal in said first zone, and
    said phase shift device is adapted to provide said interrogation signal with a second phase, different from said first phase, that places said interrogation signal out-of-phase relative to said at least one interference signal in at least a second of said zones, different from said first zone, to minimize interference from said at least one interference signal in said at least second zone.

11. The apparatus of claim 9 wherein said at least one antenna is adapted to send said interrogation signal with a fixed operating frequency.

12. The apparatus of claim 9 wherein said at least one antenna is adapted to send said interrogation signal with an operating frequency that changes over time within a same frequency band.

13. The apparatus of claim 9 wherein said phase shift device includes:
    a first branch having a first inductor and a first varactor coupled in series;
    a second branch having a second inductor and a second varactor coupled in series;
    an input terminal to receive said interrogation signal, absent said phase shift; and
    an output terminal coupled to said at least one antenna, said first and second branches being coupled in parallel between said input and output terminals, said first and second varactors being responsive to an adjustment signal provided by said processor to change a phase, at said output terminal, that is provided to said interrogation signal received at said input terminal.

14. The apparatus of claim 9 wherein said phase shift device includes a variable signal generator to generate said interrogation signal and responsive to an adjustment signal provided by said controller to change said value of said phase shift in said generated interrogation signal.

15. A method of operating a radio frequency identification (RFID) reader to minimize interference from at least one interference signal present in a radio frequency (RF) field of the RFID reader, the method comprising:
    sending an interrogation signal from said RFID reader to at least one RFID tag present in said RF field, said interrogation signal having a phase;
    changing said phase of said interrogation signal over time until a particular phase of said interrogation signal is obtained that places said interrogation signal in an out-of-phase relationship relative to said at least one interference signal, said phase shifts occurring at a rate that is less than the data transfer rate of said RFID tags, and said particular phase corresponding to minimal interference between said interrogation signal and said at least one signal relative to interference at other phases of said interrogation signal; and
    reading said at least one RFID tag using said interrogation signal at said particular phase.

16. The method of claim 15 wherein said out-of-phase relationship corresponding to minimal interference is an approximately 90 degrees phase difference between said interrogation signal and said at least one interference signal.

17. The method of claim 15 wherein changing said phase of said interrogation signal over time includes changing said phase over time in each of a plurality of zones in said RF field, including:
    providing said interrogation signal with a first phase that places said interrogation signal out-of-phase relative to said at least one interference signal in a first of said zones to minimize interference from said at least one interference signal in said first zone; and
    providing said interrogation signal with a second phase, different from said first phase, that places said interrogation signal out-of-phase relative to said at least one interference signal in at least a second of said zones, different from said first zone, to minimize interference from said at least one interference signal in said at least second zone.

18. The method of claim 15 wherein sending said interrogation signal from said RFID reader to said at least one RFID tag includes sending said interrogation signal with a fixed operating frequency.

19. The method of claim 15 wherein sending said interrogation signal from said RFID reader to said at least one RFID tag includes sending said interrogation signal with an operating frequency that changes over time within a same frequency band.

\* \* \* \* \*